US006754217B1

United States Patent
Ahn

(10) Patent No.: US 6,754,217 B1
(45) Date of Patent: Jun. 22, 2004

(54) ASYNCHRONOUS TRANSFER MODE INTERFACE MODULE

(75) Inventor: Jeong Jun Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/222,170

(22) Filed: Dec. 29, 1998

(30) Foreign Application Priority Data

Dec. 30, 1997 (KR) ............................................. 97-79482
Sep. 8, 1998 (KR) ............................................. 98-37034

(51) Int. Cl.[7] ............................................. H04L 12/56
(52) U.S. Cl. ..................................... 370/395.6; 370/474
(58) Field of Search ........................... 370/395.1, 395.6, 370/395.7, 474, 469, 476, 395.64

(56) References Cited

U.S. PATENT DOCUMENTS

| | | | | |
|---|---|---|---|---|
| 5,414,707 A | * | 5/1995 | Johnston et al. | ............... 370/79 |
| 5,420,858 A | * | 5/1995 | Marshall et al. | ............ 370/60.1 |
| 5,541,926 A | * | 7/1996 | Saito et al. | ................ 370/94.2 |
| 5,548,587 A | | 8/1996 | Bailey et al. | |
| 5,742,765 A | * | 4/1998 | Wong et al. | ............. 395/200.6 |
| 5,781,320 A | * | 7/1998 | Byers | .......................... 359/123 |
| 5,864,554 A | * | 1/1999 | Rostoker et al. | ............ 370/395 |
| 5,959,996 A | * | 9/1999 | Byers | .......................... 370/401 |
| 6,005,865 A | * | 12/1999 | Lewis et al. | ................ 370/398 |
| 6,009,096 A | * | 12/1999 | Jaisingh et al. | ............. 370/395 |
| 6,075,788 A | * | 6/2000 | Vogel | .......................... 340/395 |
| 6,122,281 A | * | 9/2000 | Donovan et al. | ............ 370/401 |

* cited by examiner

Primary Examiner—Steven H. D Nguyen
Assistant Examiner—Duc Duong
(74) Attorney, Agent, or Firm—McKenna Long & Aldridge LLP

(57) ABSTRACT

The present invention relates in general to an interface module of an asynchronous transfer mode(ATM) terminal using the ATM for transmitting information, particularly to an ATM interface module having an interfacing function required to ATM communication terminals which supports other services and capable of interfacing with the other upper layer service modules by changing an interface module software according to a respective service type.

An ATM interface module, in which the ATM interface module performs an ATM interface between a physical layer and an upper layer connected to an ATM network, comprising physical layer interface means for converting a signal applied from an external ATM network into an ATM format signal and then outputting the converted ATM signal, ATM layer processing means for selecting a payload part(SAR-PDU: segmentation and reassembly protocol data unit) by using a header information of an ATM cell among signals applied from the physical layer interface means and outputting the SAR-PDU to a control interface means, and control interface means for converting the payload part applied from the ATM layer processing means into a format signal which is required for an upper layer service and outputting the converted format signal.

16 Claims, 9 Drawing Sheets

ASYNCHRONOUS TRANSFER MODE INTERFACE MODULE

BACKGROUND

1. Technical Field

The present invention relates in general to an interface module of an asynchronous transfer mode(hereinafter, referring to ATM) terminal using the ATM for transmitting information, particularly to an ATM interface module having an interfacing function required to ATM communication terminals which supports other services and capable of interfacing with the other upper layer service modules by changing an interface module software according to a respective service type.

2. Background

Generally, the ATM terminal using the ATM is consisted of a network connection module unit for connecting to the ATM network, and a service function process module for processing the service to be provided through the terminal. Here, a main processor inside the service function process module unit, controls the network connection module unit and the service function process module unit.

Figure 1A:
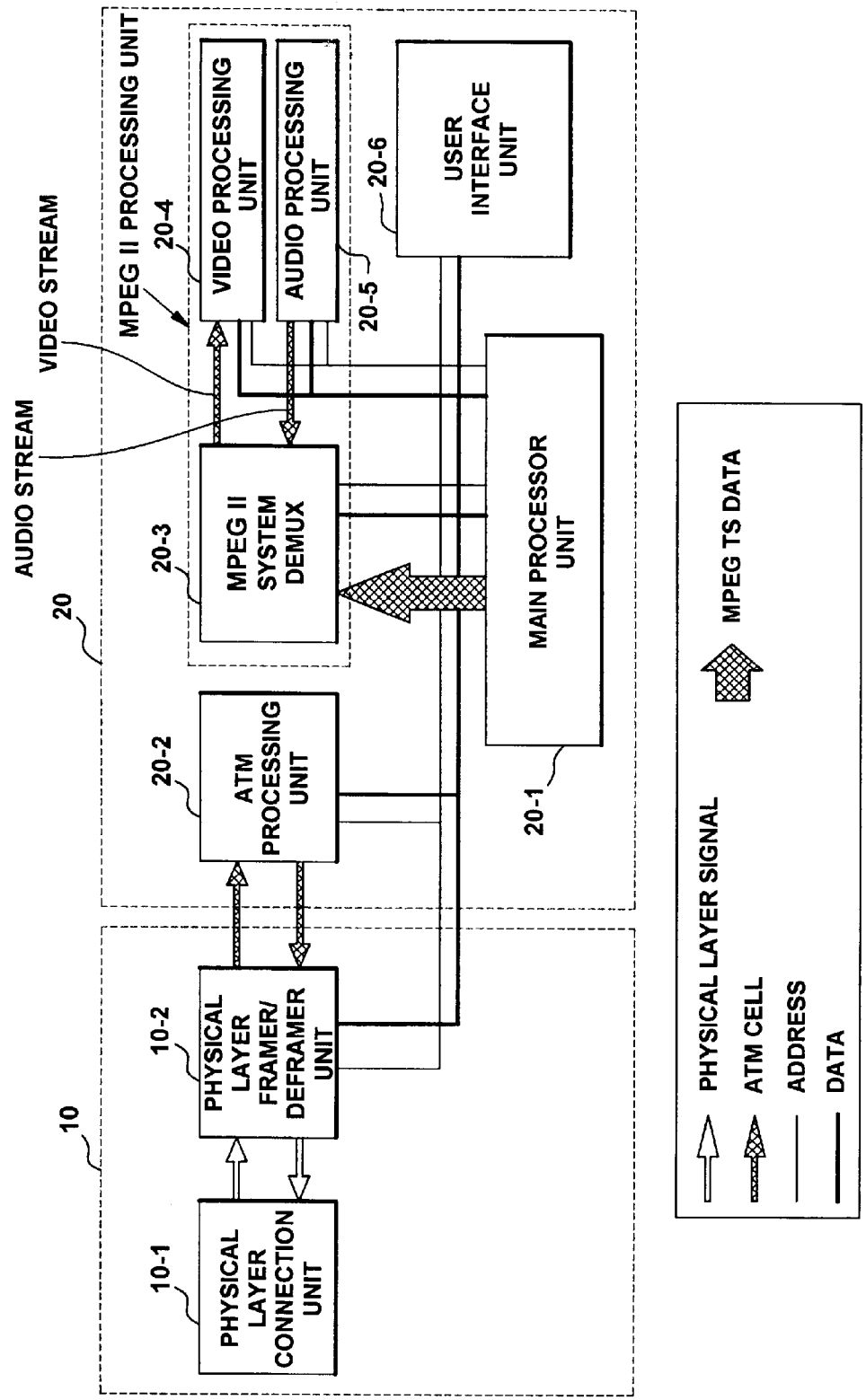

For instance, referring to FIG. 1a, the ATM communication terminal of providing a video on demand service (VODS), comprises a network connection module unit 10 and a service function process module 20. Here, the network connection module unit 10 comprises a physical layer connection unit 10-1, and a physical layer framer/deframer 10-2. And the service function process module 20 comprises a main processor unit 20-1, and an ATM processing unit 20-2, a MPEG(Moving Picture Experts Group)-2 system demultiflexer 20-3, a video processing unit 20-4, an audio processing unit 20-5, and a user interface unit 20-6.

Figure 1B:
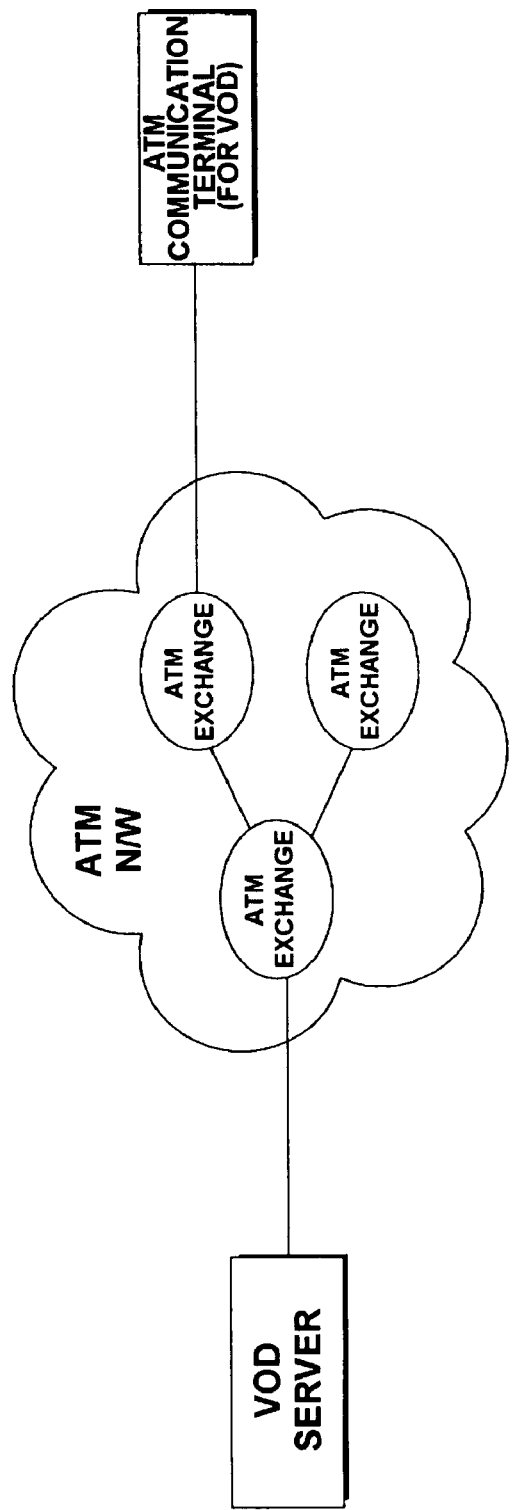

Referring to FIG. 1b, the ATM communication terminal service may be briefly explained when the above terminals are operated. It is assumed that the ATM communication terminals have a same composition in FIG. 1a.

It is noted that the ATM communication terminal already has a set value for connecting to the ATM network via the user interface. The ATM communication terminal has an allocated channel path for receiving/sending data from/to the video on demand(VOD) server by connecting to the ATM network(in which ATM exchanges are included). And the ATM communication terminal requires a content of the VOD server via the channel path for sending and receives the content of the VOD server data via the channel path for receiving. And a user selects a video title by using the received content and then requires to receive the data to the VOD server via the channel path for sending.

It will be in detail explained how to establish the service processing procedures from the VOD server via the ATM network by followed 3 types.

A first type of procedure is that the channel path is allocated by connecting to the ATM network. A second type of procedure is that a general data is sent/received via sending/receiving paths, and a last type of procedure is that a received MPEG(moving picture experts group)-2 TS(transport stream) is processed.

Figure 1C:
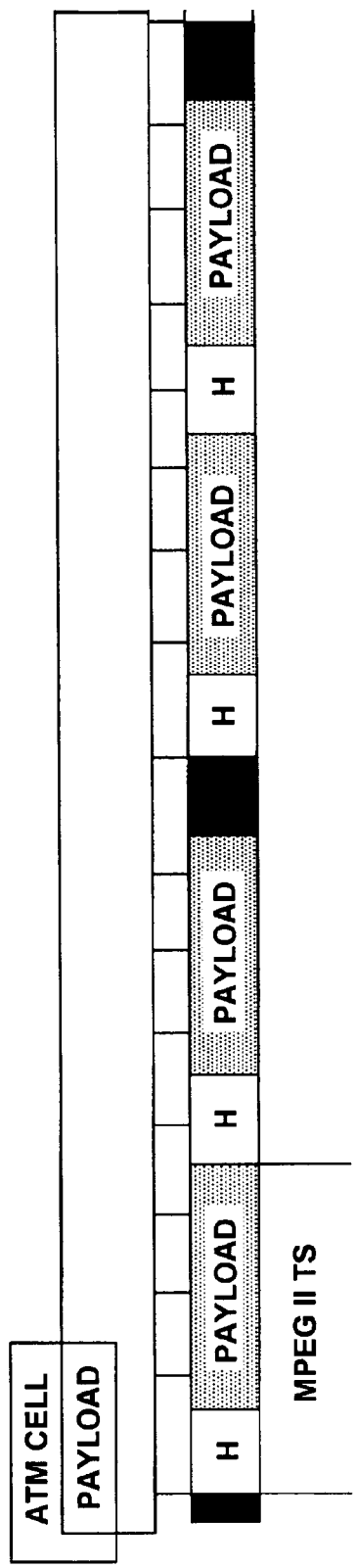

The VOD server stores the MPEG-2 TS. And the MPEG-2 TS type and a method for mapping the stream to an ATM cells are shown in FIG. 1c.

In the first type procedure for allocating the channel path by connecting to the ATM network, the ATM communication terminal has a process module for allocating an ATM path in the main processor unit 20-1. The main processor unit 20-1 receives a data and requires a process of a signaling cell to the ATM processing unit 20-2 by composing a payload of a signaling cell, in which the data includes a content which tells that a user wants to connect to the VOD server. The ATM processing unit 20-2 composes a completed signaling cell by inserting a signaling cell header, and then sends the cell to the physical layer framer/deframer unit 10-2. The physical layer framer/deframer unit 10-2 maps the received ATM cells in a payload area which has a frame type commonly used in the physical layer. And the physical layer framer/deframer unit 10-2 inserts an overhead information in the mapped ATM cell according to a content which is initialized in the main processor unit 20-1. Here, the ATM cell having the overhead information is a completed physical layer frame. The physical layer framer/deframer unit 10-2 sends the completed physical layer frame to the physical layer connection unit 10-1. And the physical layer connection unit 10-1 changes the frame to a signal which is commonly used in the ATM network, and sends the signal to the ATM network.

A signal received from the ATM network by passing through an opposite procedure, is converted into a frame type, which is commonly used in the physical layer, through the physical layer connection unit 10-1 by using a deframer function in the physical layer framer/deframer unit 10-2. And then, after selecting the ATM cell in the payload area except the overhead information, the selected ATM cell is sent to the ATM processing unit 20-2. The ATM processing unit 20-2 determines that the received ATM cell includes a signaling data by using an ATM cell header information, sends the payload of the cell to the main processor unit 20-1 in case of including the signaling cell, and then notifies to the main processor unit 20-1 that the cell processing is completed.

The main processor unit 20-1 analyzes the payload of the received cell with a data in order to interface with the VOD server, in which the data may be used for setting a channel for receiving/sending from/to the VOD server. Here, a channel which receives the MPEG data, is commonly differentiated from a channel which receives the general data. And also it is common that a channel path for sending is allocated.

In the second type procedure of sending/receiving the general data via the sending/receiving path, a receiving process is the same as the first type in composing the signaling cell. Here, it is the same that when the header information of the ATM cell is sent, the channel path which is allocated in the signaling cell process unit, is used. And also it is same that when the ATM cell received from the ATM processing unit 20-2, is processed, the channel path which is allocated from the signaling cell processing unit is used. When the general data is sent/received, the same data structure as used in the VOD server is generally used.

In the last type procedure of processing the received MPEG-2 TS, the ATM processing unit 20-2 sends the payload area of the ATM cell header information except the header to the main processor unit 20-1, after mapping the MPEG-2 TS in the ATM cell payload and sending the mapped MPEG-2 TS to the ATM terminal. The main processor unit 20-1 analyzes whether the payload processed from the ATM processing unit 20-2, is the signaling cell, the general data, or the content including the MPEG-2 TS by using the content processed from the ATM processing unit 20-2.

The main processor unit 20-1 stores the content including the MPEG-2 TS, temporarily. And the main processor unit 20-1 selects the MPEG-2 TS only, and then sends the selected stream to a MPEG-2 system demultiflexer 20-3. The MPEG-2 system demultiflexer 20-3 analyzes the received MPEG-2 TS and separates the MPEG-2 TS into a video stream and an audio stream. And the MPEG-2 system demultiflexer 20-3 sends the video stream to a video process unit 20-4 and the audio stream to an audio process unit 20-5 respectively, in order that the user may watch the video.

The main processor unit 20-1 is easy to be overloaded because of initiating the physical layer framer/deframer unit 10-2, the ATM processing unit 20-2, the MPEG-2 system demultiflexer 20-3, the video processing unit 20-4, the audio processing unit 20-5, and the user interface unit 20-6, and have a service process module function which is required by each process module. Accordingly, high capacity processor should be required. And also there are disadvantages, such that the network connection module unit and an upper service processing module unit are composed respectively and it is united to one processor after the overall shape is changed when the upper layer service which is applied by the above structure, is changed.

Further information on an adapter for interfacing the ATM network can be found in copending U.S. Pat. No. 5,548,587, entitled "Asynchronous transfer mode adapter for desktop applications", which is incorporated by reference herein.

But, the conventional ATM communication terminal is designed in order to control the ATM interface function by a corresponding control device. Therefore, there are problems that a hardware/software of a single type ATM terminal should be changed for interfacing with the service module of other different upper layer in case of developing the single type ATM terminal which may provide for the other services. Consequently, it takes so much time to develop a hardware/software for the single type ATM terminal.

SUMMARY

Accordingly, the present invention is provided to solve the problems. The present invention has an independent module in order to process, by adding an ATM processing unit on the network connection module unit which is connected to the ATM network, controlling the ATM process unit with an extra processor, and separating the upper layer and the ATM layer. Thereby, an object of the present invention is to provide an ATM interface module capable of using the conventional service processing functions by using the ATM network. And it is established by using the interface between the upper layer and the ATM layer with last input/output, in which the last input/output are commonly used in the upper layer, even though the ATM interface module does not know how to process the ATM in the service function process module provided in the upper layer.

One embodiment of the present invention to achieve the object provides an ATM interface module comprising an ATM layer processing means for outputting a useful ATM cell payload(SAR-PDU: segmentation and reassembly protocol data unit) to the control interface means after selecting the SAR-PDU area by using a header information in the ATM cell which is from the physical layer interface unit and inserting an ATM cell header information after separating a data(CS-PDU: convergence sublayer protocol data unit) to the SAR-PDU, and outputting an ATM cell, in which the ATM cell is a SAR-PDU including the header information and in which the CS-PDU is for sending to an external ATM network, a physical layer interface means for mapping the ATM cell applied from the ATM layer processing means, in a payload area of the physical layer frame commonly used in the external ATM network, or for selecting an ATM cell from the physical layer frame payload area applied from the ATM network and the selected ATM cell to the ATM layer processing means, and a control interface means for converting the several SAR-PDUs into a U-SDU(user service data unit), in which the U-SDU includes a data required from the upper layer service process module or an upper layer service control protocol data, and outputting the U-SDU or for converting the U-SDU applied from the upper layer service process module into a certain data format for processing to the ATM cell in the ATM layer processing means and outputting the certain data format to the ATM layer processing means.

Another embodiment of the present invention to achieve the object provides an ATM interface module, comprising an ATM layer processing means for outputting a SAR-PDU to the control interface means after selecting the SAR-PDU area by using a header information in the ATM cell which is from the physical layer interface means and inserting an ATM cell header information after separating a CS-PDU to the SAR-PDU, and outputting an ATM cell, in which the ATM cell is a SAR-PDU including the header information and in which the CS-PDU is for selecting to an external ATM network, a physical layer interface means for mapping the ATM cell applied from the ATM layer processing means in a payload area of the physical layer frame commonly used in the external ATM network, or for selecting an ATM cell from the physical layer frame payload area applied from the ATM network and the selected ATM cell to the ATM layer processing means, and a control interface means for controlling the ATM layer processing means in order to determine that the ATM cell payload applied from the ATM layer processing means is for an ATM network connection or for an external host, and for selecting and maintaining a parameter for a network connection from the ATM cell payload applied from the ATM layer processing means after generating a control data for a network connection to the SAR-PDU format.

The present invention includes the physical layer interface means comprising a physical layer connection unit for sending/receiving a frame which is including the ATM cell by matching with the ATM network, and a physical layer framer/deframer unit for mapping the ATM cell which is applied from the ATM layer processing means, in a payload area of the frame which is commonly used in the physical layer and outputting the mapped ATM cell or for selecting the ATM cell in the payload area of the frame applied from the physical layer connection unit and outputting the selected ATM cell to the ATM layer processing means.

The present invention includes the ATM layer processing means comprising a first memory unit for storing a data which is applied from the control interface means for sending to an external ATM network and an ATM processing unit for selecting an ATM cell payload(SAR-PDU) area after selecting a useful ATM cell by using a header information in the ATM cell which is from the physical layer interface means and outputting the SAR-PDU to the control interface means, or inserting an ATM cell header information after separating a data(CS-PDU: convergence sublayer protocol data unit) stored in the first memory unit to the SAR-PDU, and outputting the ATM cell to the physical layer interface means.

The present invention includes the control interface means comprising a second memory unit for storing the ATM cell payload(SAR-PDU) applied from the ATM layer processing unit, and a control processor unit for converting a CS-PDU into a U-SDU(user service data unit) after converting the several SAR-PDUs stored in the second memory unit into the CS-PDU format, in which the U-SDU includes a data required from the upper layer service process module or an upper layer service control protocol data, and outputting the U-SDU or for converting the U-SDU applied from the upper layer service process module, into a certain data format(CS-PDU) for processing to the ATM cell in the ATM layer processing means and outputting the CS-PDU to the ATM layer processing means.

Other technical advantages are readily apparent to one skilled in the art from the following figures, descriptions, and claims.

BRIEF DESCRIPTION

Figure 2:
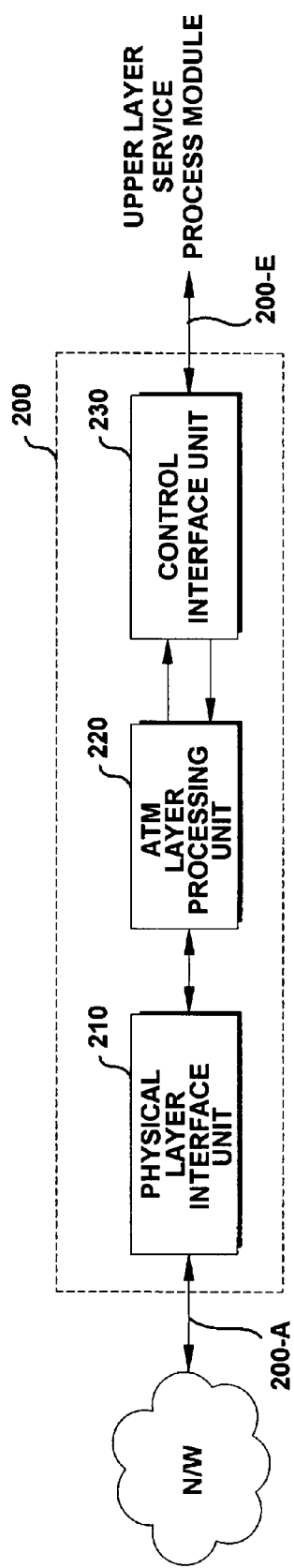
Figure 3:
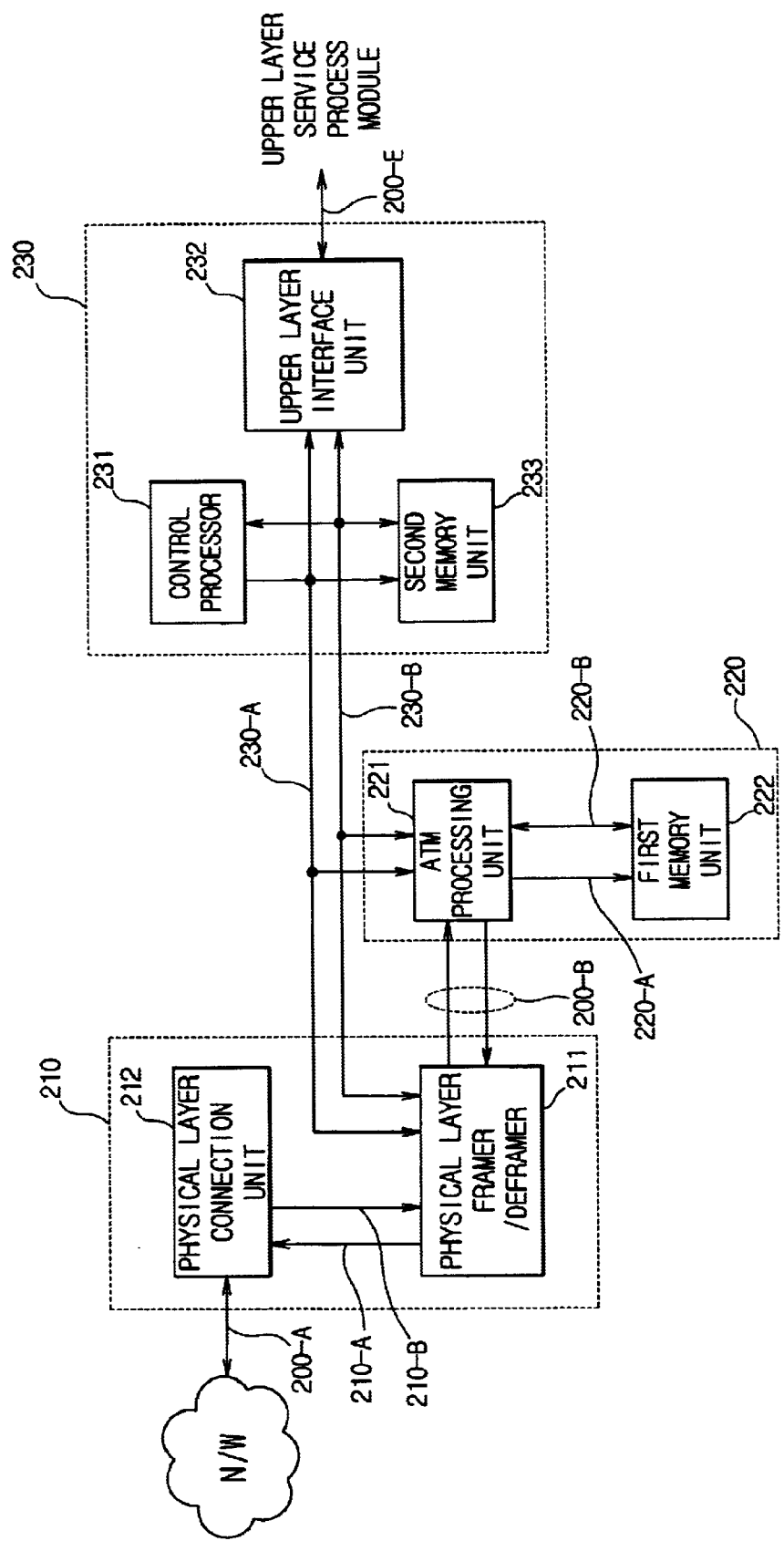
Figure 4:
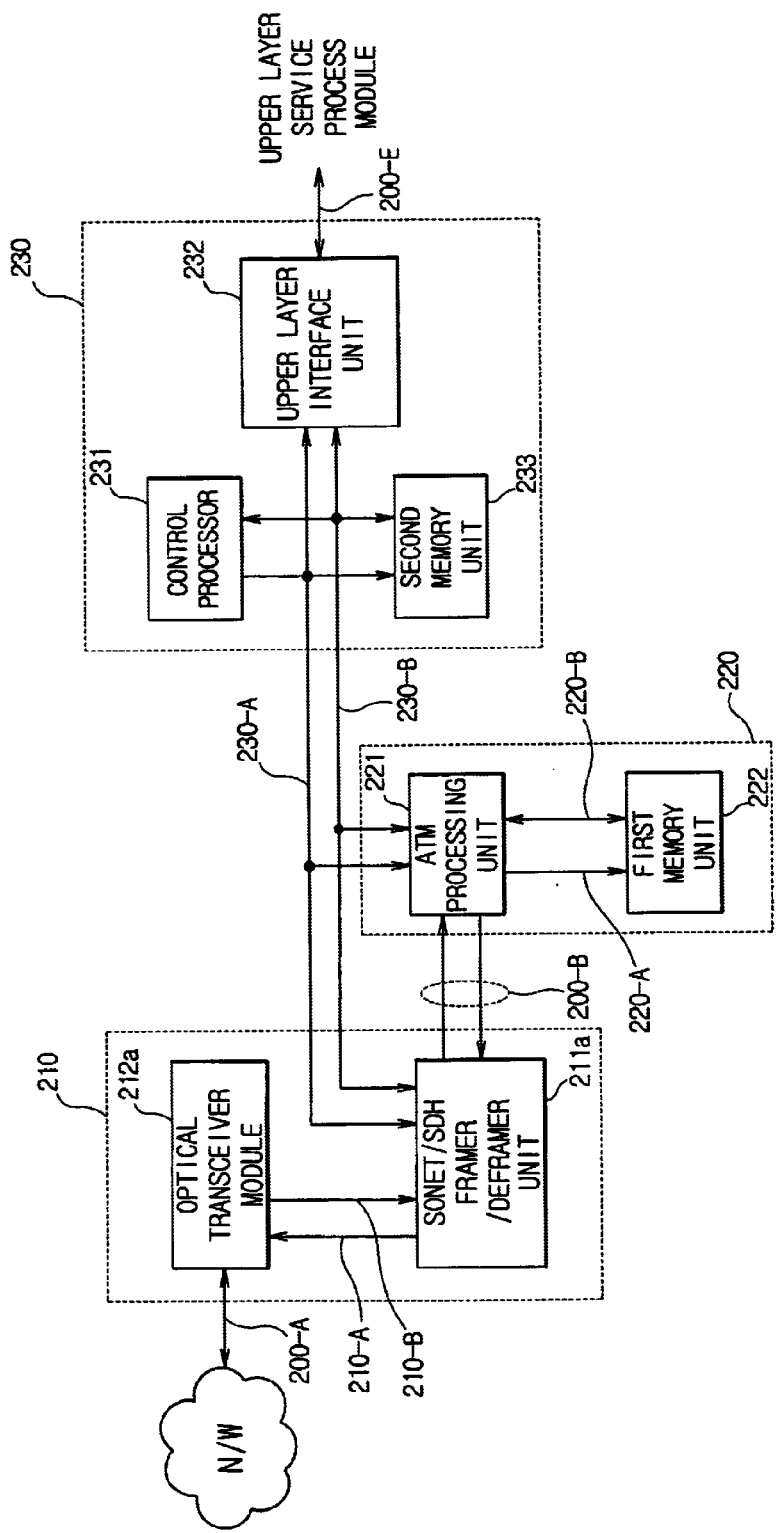
Figure 5:
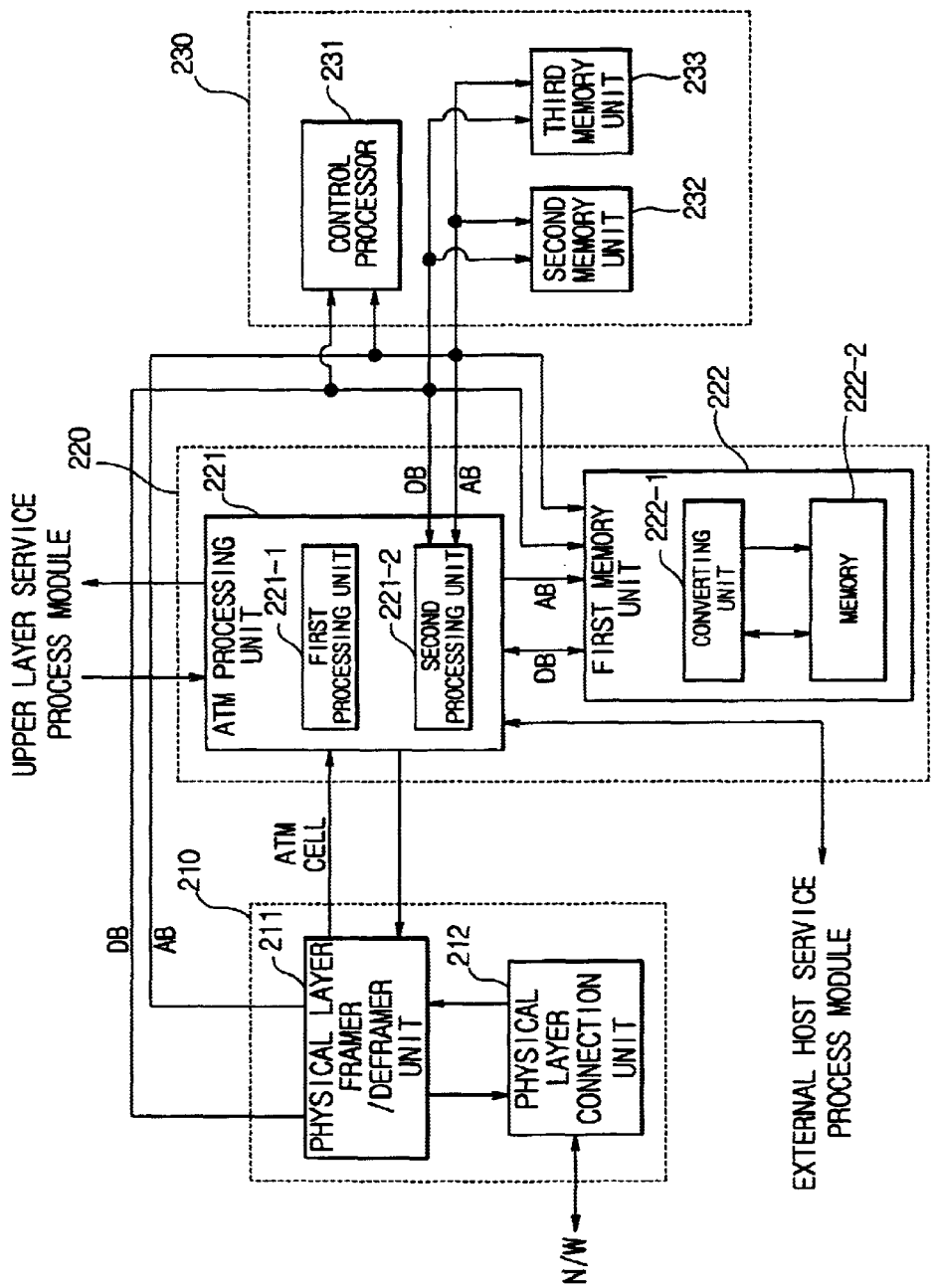
Figure 6:
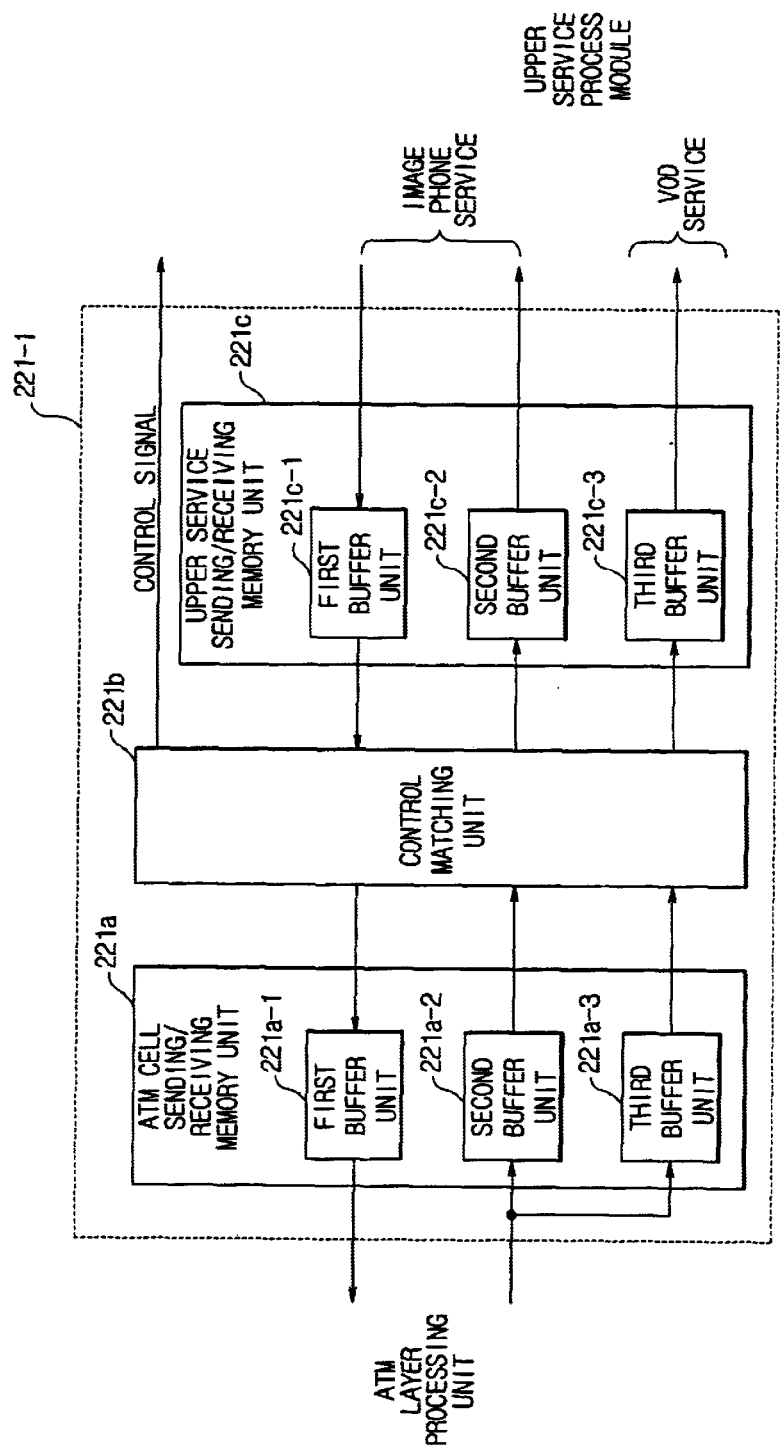
Figure 7:
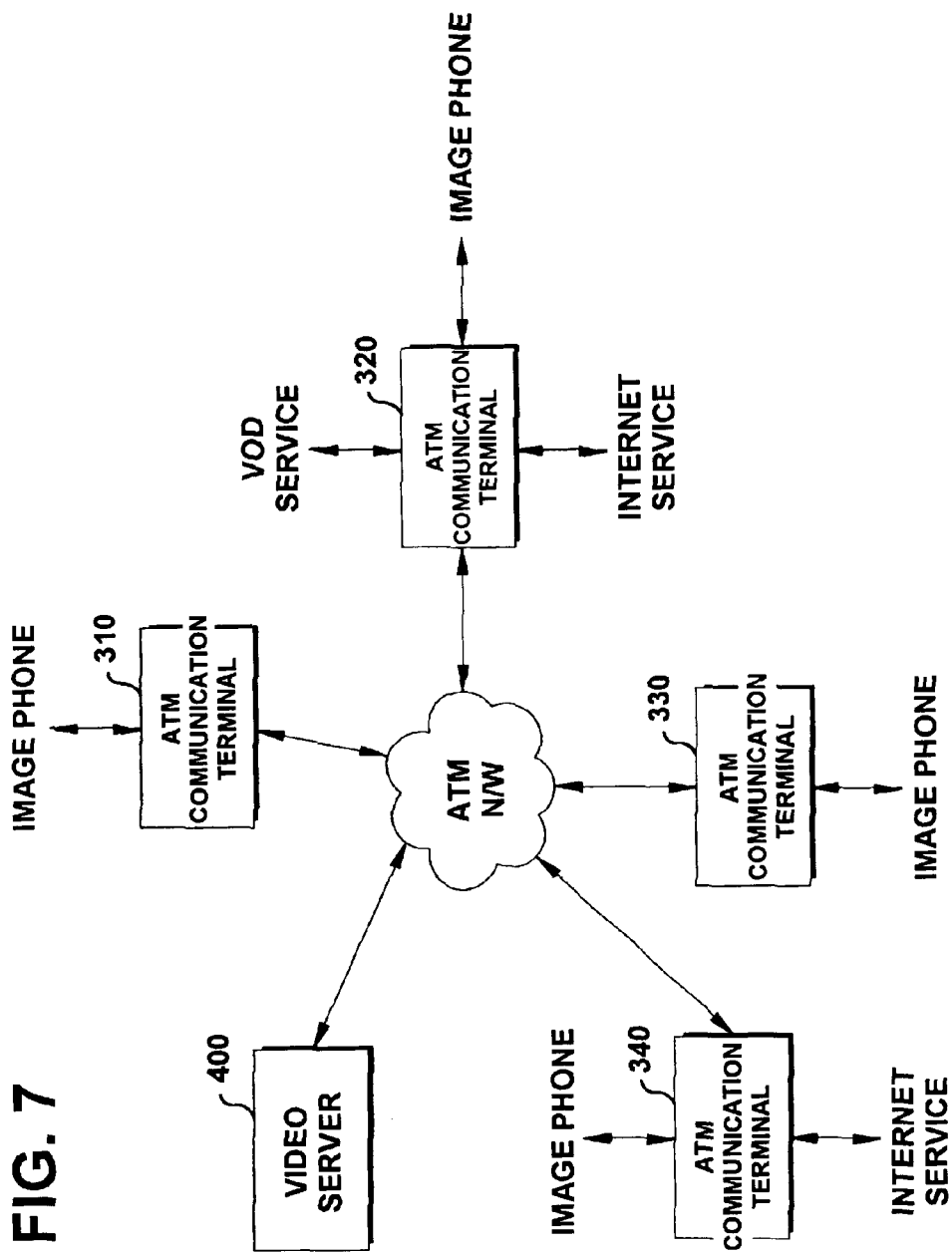

Other objects, features and advantages of the present invention will become more apparent from the following detailed description when read in conjunction with the accompanying drawings, in which:

FIG. 1a is a conceptual illustration of a conventional ATM communication terminal, FIG. 1b illustrates a service example of the ATM communication terminal, FIG. 1c is a diagram indicating a mapping example to the ATM cell of the MPEG-2 TS, FIG. 2 is a conceptual block diagram of a composition about the ATM interface module according to an embodiment of the present invention, FIG. 3 indicates in detail a block diagram of the ATM interface module referring to FIG. 2, FIG. 4 is a conceptual block diagram of the ATM interface module according to another embodiment of the present invention, FIG. 5 indicates in detail a block diagram of the ATM interface module referring to FIG. 4, FIG. 6 indicates in detail a block diagram of a first processing unit of FIG. 5, and FIG. 7 illustrates a conceptual diagram the VOD service network applied to the ATM interface module of the present invention.

DETAILED DESCRIPTION OF THE PREFERRED EMBODIMENTS

Embodiments of the invention will be described with reference to the accompanying drawings.

FIG. 2 shows a conceptual illustration of a composition about the ATM interface module according to an embodiment of the present invention. The ATM interface module 200 according to the present invention comprises a physical layer interface unit 210, an ATM layer processing unit 220, and a control interface unit 230 which are connected to each other internally through a host address bus 230-A and a host data bus 230-B. And also the ATM interface module 200 is respectively connected to an external ATM network through a frame sending/receiving path 200-A and an upper layer service process module through U-SDU data sending/ receiving path 200-E which are commonly used in the physical layer.

FIG. 3 indicates in detail a block diagram of the ATM interface module in FIG. 2. The physical layer interface unit 210 comprises a physical layer framer/deframer unit 211 and a physical layer connection unit 212 which are internally connected to each other through frame sending/receiving paths 210-A, 210-B. Particularly, the physical layer framer/ deframer unit 211 is connected to the control interface unit 230 through the host address bus 230-A and the host data bus 230-B, and also is connected to an ATM processing unit 221 of the ATM layer processing unit 220 through the ATM cell sending/receiving path 200-B having 53 bytes.

The ATM layer process unit 220 has the ATM processing unit 221 and a first memory unit 222 which are internally connected to each other through a local address bus 220-A and a local data bus 220-B. Particularly, the ATM processing unit 221 is connected to the control interface unit 230 through the host address bus 230-A and the host data bus 230-B.

Additionally, the control interface unit 230 has a control processor 231, an upper layer interface unit 232, and a second memory unit 233 which are internally connected to each other through the host address bus 230-A and the host data bus 230-B.

Besides, the first memory unit 222 may be composed of 32 bits, is capable of expending to 2 Mega*32 bit(8 Megabyte). And a memory map of the unit 222 comprises a sending unit, a receiving unit, and a common unit. It will be explained in detail from now on.

The sending unit comprises a managing area of managing the ATM cell header, a state area of notifying the cell sending state, a location designation area of designating a location where stores the CS-PDU, and a sending data area of storing the CS-PDU. Here, a memory operating method is operating the state area and the location designation area as a queue format, and other areas are operated as a sequential format.

The receiving unit comprises a header information control area of storing a data for selecting a useful cell among the ATM cells which are transmitted from the physical layer, a managing area of managing the state of the cells having the useful header, a state area of notifying the received cell processing state, and a location designation area of designating the location for storing the payload of the received cell. And a memory operating method is the same as the above sending unit the state area and location designation area are operated as the queue format, and other areas are operated; as the sequential format.

The common unit is an area for cell processing by the ATM processing unit. And the control processor of the control interface unit can not be accessed in the common unit.

The second memory unit can be divided into a ROM area and a RAM area.

The ROM area operates the control processor and stores an operating program(S/W) which is relates to a function of an overall module.

The RAM area can be expended to 32 bit according to a user request, and the overall size depends on the control processor. And the 2 Megabyte(256K*32 bit) of ROM is used. The RAM area has a memory map which is separated into a received data storage area of storing the ATM cell payload and a user sending data storage area of storing a data for transmitting to an external ATM network among data received from the upper user interface.

The physical layer interface unit 210 sends a mapped ATM cell which is applied from the ATM layer processing unit 220 to the external ATM network by mapping the ATM cell in the physical layer frame payload area which is commonly used the external ATM network. Or the physical layer interface unit 210 outputs a selected ATM cell to the ATM layer processing unit after selecting the ATM cell in the physical layer frame payload area applied from the ATM external ATM network.

The ATM layer processing unit 220 selects an ATM cell payload(SAR-PDU) area after selecting a useful ATM cell by using a header information in the ATM cell which is applied from the physical layer interface unit 210 and outputs the SAR-PDU to the control interface unit 230. Or the ATM layer processing unit 220 inserts an ATM cell header information after separating a data to the SAR-PDU, and outputs the ATM cell to the physical layer interface unit 210 in case of receiving the data for sending to the external ATM network from the control interface unit 230.

The control interface unit 230 converts a CS-PDU into a data format required from the upper layer service process module or a U-SDU(user service data unit), after converting the several SAR-PDUs which are applied from the ATM layer processing unit 220 into the CS-PDU format and outputs the U-SDU. And the control interface unit 230 converts the U-SDU applied from the upper layer service process module into a certain data format(CS-PDU) for processing to the ATM cell in the ATM layer processing unit and outputs the CS-PDU to the ATM layer processing unit 220.

The physical layer framer/deframer unit 211 maps the ATM cell which is applied from the ATM processing unit 221, in a payload area of the physical layer frame, and inserts the overhead information of the physical layer, and outputs the mapped ATM cell having the overhead information to the physical layer connection unit 212 through a frame sending/receiving path 210-A. And also the physical layer framer/deframer unit 211 selects the ATM cell in the payload area except the overhead information of the physical layer frame received through the frame sending/receiving path 210-B and outputs the selected ATM cell to the ATM processing unit 221. Here, the physical layer connection unit 212 uses a physical media capable of matching with the ATM network of the external area. The physical media is composed with modules, such as, an optical transceiver module in case of optical connection, a coaxial cable in case of the coaxial cable connection. For example, when the physical media is the optical connection media, the physical layer connection unit 212 and the physical layer framer/deframer unit 211 are respectively composed of the optical transceiver module and a synchronous optical network/synchronous digital hierarchy (SONET/SDH) framer/deframer unit.

The ATM processing unit 221 selects an ATM cell payload(SAR-PDU) area in the ATM cell which is from the physical layer framer/deframer 211 and outputs the SAR-PDU to the control interface unit 230. And the ATM processing unit 221 separates a data(CS-PDU: convergence sublayer protocol data unit) stored in a first memory unit 222, into the SAR-PDU through the local address bus 220-A and the local data bus 220-B. And the ATM processing unit 221 inserts the ATM header information of the ATM cell to the SAR-PDU and outputs the SAR-PDU to the physical layer framer/deframer unit 211. The first memory unit 222 stores a data in the sending data area as a CS-PDU format, in which the data is for sending to the external area ATM network applied from the control interface unit 230.

The control processor 231 converts the CS-PDU into the U-SDU(user service data unit) after converting the several SAR-PDUs stored in the receiving data area of the second memory unit into the CS-PDU format, in which the U-SDU includes a data required from the upper layer service processing module or an upper layer service control protocol data and outputs the U-SDU. Also, the control processor 231 converts the U-SDU applied from the upper layer service process module into a certain data format(CS-PDU) for processing to the ATM cell in the ATM layer processing unit 220 and outputs the CS-PDU to the ATM layer processing unit 220. The upper layer interface unit 232 matches the upper layer service process module and the control processor 231. And the second memory unit 233 stores the SAR-PDU applied from the ATM layer processing unit 220 in the receiving data area.

Besides, FIG. 4 is a conceptual block diagram of the ATM interface module according to the other embodiment of the present invention. It shows the ATM interface module capable of interfacing between the ATM network and the upper layer service process module, between the ATM network and the external host service process module, and between the upper layer service module and the external host service process module. Here, the control interface unit 230 controls the ATM layer processing unit in order that the unit 230 determines whether the ATM cell payload applied from the ATM layer processing unit, is for the ATM network connection or for the external host. And then it is proper to compose that the control interface unit 230 generates the control data for a network connection as the SAR-PDU format and sends the control data to the ATM layer processing unit. Or the control interface unit 230 selects parameters for network connection in the ATM cell payload applied from the ATM layer processing unit 220 and maintains the selected parameters.

FIG. 5 shows a block diagram indicating the ATM interface module of FIG. 4 in detail. Particularly, it shows an internal circuit of the ATM layer processing unit 220 and the control interface unit 230 which are different from the embodiment of FIG. 3.

The ATM layer processing unit 220 comprises an ATM processing unit 221 which comprises a first processing unit 221-1 for selecting and processing a video on demand (VOD) and an image phone stream among the ATM cells applied the physical layer interface unit 210 and converting the image phone stream into an ATM cell and interfacing the upper service, and a second processing unit 221-2 for separating a cell for maintaining the ATM network connection among the ATM cell applied from the physical layer interface unit 210, and a cell which is required from the external host respectively and then processing each separated cells.

Also, the ATM layer processing unit 220 comprises the first memory unit 222 which is comprising a memory area 222-2 for commonly used by the second processing unit 221-2 inside the ATM processing unit 221 and the control processor 231 inside the control interface 230, and a converting unit 222-1 for controlling each access means in order that the second processing unit 221-2 and the control processor 231 respectively, access the memory area exclusively.

The control interface means 230 comprises a second memory unit 232 for storing the ATM cell payload(SAR-PDU) applied from the second processing unit 221-2 inside the ATM layer processing unit 220, and a control processor 231 for selecting a parameter for the ATM network connection by analyzing the ATM cell payload stored in the second memory unit 232, generating a data for the ATM network connection according to the parameter, and then outputting the generated data to the ATM layer processing unit 220. And also the control interface unit 230 comprises the third memory unit 233 for storing a firmware which is required for operating the control processor.

FIG. 6 shows a block diagram about the first processing unit 221-1 inside the ATM processing unit 221 of FIG. 5. The first processing unit 221-1 further comprises an ATM cell sending/receiving memory unit 221a for storing the data in accordance with the ATM cell payload applied from the physical layer interface unit 210, as a 48 byte unit temporarily and outputting the data, an upper service sending/receiving memory unit 221c for interfacing the VOD and the image phone stream to the upper service process module, and a control matching unit 221b for controlling the data flow between the ATM cell sending/receiving memory unit 221a and the upper service sending/receiving memory unit 221c, and matching the interface between the physical layer interface unit 210 and the upper service process module after inserting/erasing a header part of the ATM cell payload.

Here, the ATM cell sending/receiving memory unit 221a comprises a first buffer unit 221a-1 of sending a data for providing an image phone service respectively, a second buffer unit 221a-2 of receiving a data for providing the image phone service, and a third buffer unit 221a-3 of sending/receiving a data for providing a VOD service.

And the ATM cell sending/receiving memory unit 221c comprises a first buffer unit 221c-1 of sending a data for providing an image phone service respectively, a second buffer unit 221c-2 of receiving a data for providing the image phone service, and a third buffer unit 221c-3 of sending/receiving a data for providing a VOD service FIG. 7 illustrates conceptually the VOD service network applied to the ATM interface module of the present invention. It is an example of using the ATM interface module inside a united terminal for providing that other services which are provided from the ATM communication terminals 310–340, unit an internet service on the basis of the VOD, the image phone, and TCP/IP.

Now it will be explained in detail about an operation according to each embodiment of the present invention.

According to one embodiment of the present invention shown in FIGS. 2 and 3, the physical layer connection unit 212 performs an optical connection by using an optical transceiver module in the ATM interface module of a VOD set top box(STB). And the physical layer framer/deframer unit 211 composes a network by using a SONETWORK/SDH framer/deframer unit in the ATM interface module 20 of the VOD STB. Here, the operation may be explained by separating into the 2 procedures. One is a process of receiving the ATM data from the external area ATM network and another is a process of sending the ATM data to the ATM network.

First, it will be explained about receiving process. The physical layer interface unit 210 receives a data(in other words, a frame type commonly used in the physical layer: SONETWORK/SDH frame data in the present invention) which is including the ATM data received from the video server, with an optical transceiver module and converts the optical signal to an electric signal. Here the optical transceiver module 212a is used as the physical layer connection unit 212. And the physical layer interface unit 210 sends the electric signal to a SONETWORK/SDH framer/deframer unit 211a. Here, the SONETWORK/SDH framer/deframer unit 211a is used as the physical layer framer/deframer unit 211. The SONETWORK/SDH framer/deframer unit 221a selects a required information from the physical layer by using the deframer in the overhead area of the frame data, selects the ATM cell in the payload area of the frame data, and applies the ATM cell to the ATM layer processing unit 220. Accordingly, the ATM layer processing unit 220 compares the ATM cell head unit with the received ATM cell and eliminates a useless ATM cell. Therefore, the ATM layer process unit 220 selects a valid ATM cell only which is required from the STB and the second memory unit 233 of the control interface unit 230 stores the payload(SAR-PDU) except the header information. And the control processor 231 reads the SAR-PDU stored in the second memory unit 233 and converts the SAR-PDU to a CS-PDU format. And the control processor 231 converts the CS-PDU to a data format(U-SDU) which is required from the upper layer service process module, in which the control processor 231 converts the CS-PDU to a MPEG-2 type TS(transport stream) or an upper layer service control protocol data in accordance with the embodiment of the present invention, and then applies the converted data format(U-SDU) to the upper layer service process module through the upper layer interface unit 232.

And then it will be explained about an operation for sending the data to the external ATM network. When the data is received in a user sending data area of the second memory 233 from the upper layer service process module through the upper layer interface unit 232, the control processor 231 determines that the data is for controlling the ATM interface module 200 inside the terminal or for sending to the external network. If the received data(U-PDU) is for sending the external network, the control processor 231 converts the data to the CS-PDU for processing the ATM cell in the ATM layer process unit 220, and stores the CS-PDU the sending data area of the first memory unit 222. Otherwise, the control processor 231 controls the ATM layer processing unit 220 or the physical layer interface unit 210 using the data. The ATM processing unit 221 of the ATM layer processing unit 220 generates the ATM cell header and maps the CS-PDU in the payload of the ATM cell and makes the complete ATM cell in case that the CS-PDU data is stored in the sending data area of the first memory unit 222. And then the ATM processing unit 221 sends the complete ATM cell to the physical layer framer/deframer unit 211 of the physical layer interface unit 210. And the physical layer framer/deframer unit 211 maps the ATM cell in the payload of the predetermined frame, inserts information required from the physical layer in the frame overhead area, and makes a last data format for sending to the network by composing a complete frame(SONET/SDH frame in the present invention) for commonly using in the physical layer. And the physical layer framer/deframer 211 sends the complete frame to the external ATM network through the optical transceiver module 212a which is the physical layer connection unit 212.

Besides, according to another embodiment of the present invention shown in FIGS. 4 to 7, the procedures for receiving the ATM data from the external ATM network and sending the ATM data to the ATM network in the ATM interface modules 310–340.

First, it will be explained about receiving the ATM data from the external ATM network. A data is received from the ATM exchange to the ATM communication terminals 310–340 with the optical transceiver module 212a which is the physical layer connection unit 212. And then a required data only among the received data is selected in the corresponding ATM communication terminals 310–340 by using the framer of the physical layer framer/deframer 211, and is applied to the ATM layer processing unit 220.

And then the deframer of the physical layer framer/deframer unit 211 applies the ATM cell data in a payload area of the defreamered physical layer framer structure to the first processing unit 221-1 or the second processing unit 221-2 of the ATM processing unit inside the ATM layer processing unit 220 according to the control processor 231 inside the control interface unit 230.

Here, the ATM cell sending/receiving memory unit 221a inside the first processing unit 221-1 comprises two receiving buffers and a sending buffer. A first buffer unit 221a-1 is the sending buffer, and a second buffer unit 221a-2 is the receiving buffer. The first buffer unit 221a-1 and the second buffer unit 221a-2 are coupled to pair for an image phone service. And a third buffer unit 221a-3 is used as related to the VOD service.

Similarly, the upper service sending/receiving memory unit 221c inside the first processing unit 221-1 uses the first buffer 221c-1 and the second buffer 221c-2 for an image phone service, and the third buffer unit 221c-3 is used as related to the VOD service.

It will be explained in detail about the ATM layer processing unit 220. The ATM layer processing unit 220 compares a control value of a corresponding ATM cell with the corresponding ATM cell by depending on a control value of the second memory unit 232 inside the control interface unit 230, in which the corresponding ATM cell is applied from the physical layer framer/deframer unit 211a which is composed with the SONET/SDH framer/deframer.

Therefore, a payload part, in which the corresponding ATM cell header is erased, is applied to the first processing unit 221-1 inside the corresponding ATM layer processing unit 220. And the ATM cell applied to the second processing unit 221-2, is applied as a 53 byte ATM cell unit with the header part. Accordingly in case that the first processing unit 221-1 inside the ATM processing unit 221 includes the VOD stream in the payload of the corresponding ATM cell, the ATM layer processing unit 220 applies the ATM cell to the third buffer unit 221a-3 of the ATM cell sending/receiving memory unit 221a inside the first processing unit 221-1. In case that the ATM cell payload does not include the VOD stream, the ATM layer processing unit 220 applies the ATM cell payload to the second buffer unit 221a-2 of the ATM cell sending/receiving memory unit 221a inside the first processing unit 221-1.

It is assumed that a flag(empty) of the third buffer unit 221a-3 inside the ATM cell sending/receiving memory unit 221a is logic "1". A control matching unit 221b inside the first processing unit 221-1 selects the MPEG-2 TS by reading the content of the third buffer unit 221a-3 inside the corresponding ATM cell sending/receiving memory unit 221a, and applies the MPEG-2 TS to the third buffer unit 221c-3 inside the upper service sending/receiving memory unit 221c.

It is assumed that a flag(empty) of the second buffer unit 221a-2 inside the ATM cell sending/receiving memory unit 221a is logic "1". The control matching unit 221b inside the first processing unit 221-1 selects a receiving stream for the image phone by reading the content of the second buffer unit 221a-2 inside the corresponding ATM cell sending/receiving memory unit 221a, and applies the receiving stream to the second buffer unit 221c-2 inside the upper service sending/receiving memory unit 221c.

Here, a synchronous clock and other control signals for sending/receiving the image phone stream in the image phone module, are applied to the second buffer unit 221c-2.

It is assumed that the ATM cells are a signaling cell or an operation administration and maintenance(OAM) cell for network connection. The second processing unit 221-2 inside the ATM processing unit 221 applies the payload part of the ATM cells to the first memory unit 222 inside the ATM layer processing unit 220 through the second processing unit 221-2 inside the corresponding processing unit 221, and notifies that the data is applied to the control processor 231 of the control interface unit 230.

However, in case that the ATM cells are not the signaling cell or the OAM cell, it means that the contents of the ATM cells should be processed in the external host. So, the second processing unit 221-2 applies the ATM cell payload part to a memory related to the external host through the external host processor interface unit and then notifies that the data should be processed in the external host through the external host interface.

The data format applied through the external host interface unit is the data for internet service on the basis of TCP/IP in accordance with the embodiment of the present invention.

It will be explained about procedure for sending the ATM data to the ATM network. The control processor inside the control interface unit 230 generates the data for processing the signaling and OAM, converts the data to an ATM-PDU, and applies the ATM-PDU to the first memory unit 222 inside the ATM layer processing unit 220. The signaling and the OAM is used for maintaining the ATM network connection.

And the ATM processing unit 221 of the ATM layer processing unit 220 separates the ATM-PDU to an ATM cell data and sends the ATM cell data to the physical layer framer/deframer unit 211 of the physical layer interface unit, in case of storing the ATM-PDU data for sending to the first memory unit 222.

Accordingly, the second processing unit 221-2 of the ATM processing unit inside the ATM layer processing unit reads the ATM-PDU data from the external host through the external host interface and applies the ATM-PDU to the physical layer framer/deframer unit 211 inside the physical layer interface unit 210.

Additionally, the control matching unit 221b recognizes whether the sending stream for the image phone service exists in the first buffer unit 221c-1 inside the upper service sending/receiving memory unit 221c, through the buffer flag in the first processing unit 221-1 of the ATM processing unit 221.

Here, the first processing unit 221-1 reads the content of the first buffer unit 221c-1 inside the upper service sending/receiving memory unit 221c for sending the data to the external ATM network, converts the contents to the ATM-PDU data, and stores the ATM-PDU data in the first buffer unit 221a1, in case that the buffer flag is logic "1" as recognizing the sending stream. Thereby, the physical layer framer/deframer unit 211 inside the physical layer interface unit 210 reads the ATM-PDU and processes the ATM-PDU.

Accordingly, the corresponding physical layer framer/deframer unit 211 maps the ATM cell data applied from the ATM layer processing unit 220 in the payload of the SONET/SDH frame structure, converts the mapped ATM cell data to a data format for transmitting to the external network, and transmits the data format to the ATM network through the optical transceiver module 212a which is the physical layer connection unit 212.

And the control processor 231 inside the control interface unit 230 initiates the physical layer framer/deframer unit 211 and the second processing unit 221-2 of the ATM processing unit 221 inside the ATM layer processing unit 220, and supervises the operation state. Thereby, the ATM interface module 200 can be exactly operated.

The present invention has an independent terminal in order to process, by adding an ATM processing unit on the network connection module unit which is connected to the ATM network, controlling the ATM process unit with a private processor, and separating the upper layer and the ATM layer. Thereby, the present invention is to provide an ATM interface module capable of using the conventional service processing functions by using the ATM network. There are advantages of the present invention capable of making the developing time shorten and interfacing between the upper layer services by changing the software only in case of the ATM terminal which has the same physical layer interface and provides the several services.

The present invention is not limited to the specifically disclosed embodiments, and variations and modifications may be made without departing from the scope of the present invention.

What is claimed is:

1. An asynchronous transfer mode (ATM) interface module, in which the ATM interface module performs an ATM interface between a physical layer and an upper layer connected to an ATM network, comprising:

a physical layer interface means for converting a signal applied from an external ATM network into an ATM format signal and then outputting the converted ATM signal;

an ATM layer processing means for selecting a payload part (SAR-PDU: segmentation and reassembly protocol data unit) by using a header information of an ATM cell among signals applied from the physical layer interface means and outputting the SAR-PDU to a control interface means; and a control interface means for converting the payload part applied from the ATM layer processing means into a format signal which is required for an upper layer service and outputting the converted format signal;

wherein the ATM layer processing means comprises:
a first memory unit for storing a data which is applied from the control interface means, for sending to the external ATM network; and
an ATM processing unit for selecting an ATM cell payload (SAR-PDU) area after selecting a useful ATM cell by using a header information in the ATM cell which is applied from the physical layer interface means and outputting the SAR-PDU to the control interface means, or inserting an ATM cell header information after separating a data (CS-PDU: convergence sublayer protocol data unit) stored in the first memory unit to the SAR-PDU, and outputting the ATM cell which is composed of the SAR-PDU having the ATM cell header information, to the physical layer interface means;

wherein the first memory unit comprises:
a sending unit having a memory map which is divided into a managing area of managing the ATM cell header area for sending the ATM cell, a state area of notifying a cell sending state, a location designation area of designating a location which the CS-PDU is stored, and a data storage area of storing an actual CS-PDU;
a receiving unit having a memory map which is divided into a header information control area of storing a data for selecting a useful cell among the ATM cells transmitted from the physical layer, a managing area of managing a cell state having the useful header, a state area of notifying the received cell processing state, and a location designation area of designating a location for storing the received cell payload; and
a common unit of processing the ATM cell by the ATM processing unit; and wherein the control interface means comprises:
a second memory unit for storing the ATM cell payload (SAR-PDU) applied from the ATM layer processing means; and
a control processor for converting a CS-PDU into a U-SDU (user service data unit) after converting the several SAR-PDUs stored in the second memory unit into the CS-PDU format, in which the U-SDU includes a data required from the upper layer service process module or an upper layer service control protocol data, and outputting the U-SDU or for converting the U-SDU applied from the upper layer service process module, into a certain data format (CS-PDU) for processing to the ATM cell in the ATM layer processing means and outputting the CS-PDU to the ATM layer processing means.

2. The ATM interface module of claim 1, in which the ATM interface module performs an ATM interface between a physical layer and an upper layer connected to an ATM network, wherein the first memory unit manages a state area and a location designation area of the sending unit and the receiving unit respectively, as a queue format and operating the other area sequentially.

3. An ATM interface module, in which the ATM interface module performs an ATM interface between a physical layer and an upper layer connected to an ATM network, comprising:

an ATM layer processing means;
a physical layer interface means; and
a control interface means;

wherein the ATM layer processing means outputs a useful ATM cell payload (SAR-PDU: segmentation and reassembly protocol data unit) to the control interface means after selecting the SAR-PDU area by using a header information in the ATM cell which is from the physical layer interface means and inserting an ATM cell header information after separating a data (CS-PDU: convergence sublayer protocol data unit) to the SAR-PDU, and outputting an ATM cell, in which the ATM cell is the SAR-PDU including the header information and in which the CS-PDU is for sending to the external ATM network;

wherein the ATM layer processing means comprises:
a first memory unit for storing a data which is applied from the control interface means for sending to the external ATM network; and
an ATM processing unit for selecting an ATM cell payload (SAR-PDU) area after selecting a useful ATM cell by using a header information in the ATM cell which is from the physical layer interface means and outputting the SAR-PDU to the control interface means, or inserting an ATM cell header information to the SAR-PDU after separating a data (CS-PDU) stored in the first memory unit to the SAR-PDU, and outputting an ATM cell to the physical layer interface means, in which the ATM cell is composed of the SAT-PDU having the ATM cell header information;

wherein the physical layer interface means maps the ATM cell applied from the ATM layer processing means, in a payload area of a physical layer frame commonly used in the external ATM network, or for selecting an ATM cell form the physical layer frame payload area applied from the ATM network and outputting the selected ATM cell to the ATM layer processing means;

wherein the control interface means controls the ATM layer processing means in order to determine that the ATM cell payload applied from the ATM layer processing means is for an ATM network connection or for an external host, and for selecting and maintaining a parameter for a network connection from the ATM cell payload applied from the ATM layer processing means after generating a control data for the network connection to the SAR-PDU format; and wherein the control interface means comprises:
- a second memory unit for storing the ATM cell payload (SAR-PDU) applied from the ATM layer processing means;
- a control processor for converting a CS-PDU into a U-SDU (user service data unit) after converting the several SAR-PDUs stored in the second memory unit, into the CSPDU format, in which the U-SDU includes a data required from the upper layer service process module or an upper layer service control protocol data, and outputting the U-SDU or for converting the U-SDU applied from the upper layer service process module into a certain data format (CS-PDU) for processing to the ATM cell in the ATM layer processing means and outputting the converted CS-PDU to the ATM layer processing means; and
- a third memory unit for storing a firmware which is required during the control processor is operating.

4. The ATM interface module of claim 3, in which the ATM interface module performs an ATM interface between a physical layer and an upper layer connected to an ATM network, wherein the physical layer interface means comprises:
- a physical layer connection unit for sending/receiving a frame which is including the ATM cell by matching with the ATM network; and
- a physical layer framer/deframer unit for mapping the ATM cell which is applied from the ATM layer processing means, in a payload area of the frame which is commonly used in the physical layer and outputting the mapped ATM cell or for selecting the ATM cell in the payload area of the frame applied from the physical layer connection unit and outputting the selected ATM cell to the ATM layer processing means.

5. The ATM interface module of claim 3, in which the ATM interface module performs an ATM interface between a physical layer and an upper layer connected to an ATM network, wherein the physical layer interface means comprises:
- an optical transceiver module for sending/receiving a frame which is including the ATM cell, by matching with an optical communication network which uses an optical connection media; and
- a synchronous optical network (SONET)/synchronous digital hierarchy (SDH) framer/deframer unit for mapping the ATM cell which is applied from the ATM layer processing means, in a payload area of the frame which is commonly used in the physical layer and outputting the mapped ATM cell to the optical transceiver module or for selecting the ATM cell in the payload area of the frame which is applied from the optical transceiver module and outputting the selected ATM cell to the ATM layer processing means.

6. The ATM interface module of claim 3, in which the ATM interface module performs an ATM interface between a physical layer and an upper layer connected to an ATM network, wherein the ATM processing unit comprises:
- a first processing unit for processing a video on demand (VOD) and an image phone stream which is selected form the ATM cells applied the physical layer interface means and interfacing after converting the image phone stream into the ATM cell; and
- a second processing unit for separating a cell for maintaining the ATM network connection and a cell which is required from the external host respectively among the ATM cell applied from the physical layer interface means and processing each separated cell.

7. The ATM interface module of claim 6, in which the ATM interface module performs an ATM interface between a physical layer and an upper layer connected to an ATM network, wherein the first processing unit further comprises:
- an ATM cell sending/receiving memory unit for interfacing the ATM cells by a 48 byte unit in accordance with the ATM payload applied from the physical interface unit;
- an upper service sending/receiving memory unit for interfacing the VOD and the image phone stream to the upper service process module; and
- a control matching unit for controlling data flows between the ATM cell sending/receiving memory unit and the upper service sending/receiving memory unit and for matching the interface between the upper services after erasing/inserting the header part of the corresponding ATM cell.

8. The ATM interface module of claim 3, in which the ATM interface module performs an ATM interface between a physical layer and an upper layer connected to an ATM network, wherein the first memory unit comprises:
- a memory area which is commonly used by the second processing unit inside the ATM processing unit and the control processor inside the control interface means; and
- a converting unit for controlling each access means in order that the second processing unit and the control processor respectively, access the memory area exclusively.

9. The ATM interface module of claim 7, in which the ATM interface module performs an ATM interface between a physical layer and an upper layer connected to an ATM network, wherein the ATM cell sending/receiving memory unit and the upper service memory unit comprise:
- a first buffer unit of sending a data for providing an image phone service respectively;
- a second buffer unit of receiving a data for providing the image phone service; and
- a third buffer unit of sending/receiving a data for providing a VOD service.

10. An asynchronous transfer mode (ATM) interface module in an ATM communication terminal, in which the ATM interface module interfaces between an external ATM network and service process modules provided in an upper layer, comprising:
- physical layer interface means for selecting an ATM cell out of a payload area which is excepted an overhead information of a physical layer frame received from the external ATM network and then outputting the ATM cell;
- ATM layer processing means for selecting a useful ATM cell by using a header information of the ATM cell received from the physical layer interface means, selecting a segmentation and reassembly protocol data unit (SAR-PDU) area out of the useful ATM cell and outputting a SAR-PDU of the SAR-PDU area; and
- control interface means for converting into a CS-PDU after uniting the SAR-PDUs received from the ATM layer processing means, converting the CS-PDU into a data required from the service process module of the upper layer;

wherein the ATM layer processing means comprises:
a first memory unit for storing the CS-PDU received from the control interface means; and
an ATM processing unit for selecting the useful ATM cell by using the header information of the ATM cell received from the physical layer interface means, selecting the SAR-PDU area out of the useful ATM cell and outputting the SAR-PDU to the control interface means;

wherein the control interface means comprises:
a second memory unit for storing the SAR-PDUs received from the ATM layer processing means;
a control processor for converting into a U-SDU and outputting the data; and
an upper layer interface unit for performing interface between the control processor and the service process module; and wherein the first memory unit comprises:
a sending unit having a memory map which is divided into a managing area of managing a header information area for sending the ATM cell, a state area of notifying a processing state of sending of the ATM cell, a location designation area of designating a location which the CS-PDU is stored, and a data storage area of storing actually the CS-PDU;
a receiving unit having a memory map which is divided into a header information control area of storing a data for selecting the useful ATM cell out of the ATM cells received from the physical layer interface means, a managing area of managing states of the ATM cells having a useful header information, a state area of notifying a received ATM cell processing state, and a location designation area of designating a location for storing a payload of a received ATM cell; and
a common unit of using as an area for being processed the ATM cell by the ATM processing unit.

11. The ATM interface module of claim 10, wherein the first memory unit manages the state areas and the location designation areas of the sending unit and the receiving unit as a queue format, and manages other areas as a sequential format.

12. An asynchronous transfer mode (ATM) interface module in an ATM communication terminal, in which the ATM interface module interfaces between an external ATM network and service process modules provided in an upper layer, comprising:

physical layer interface means for selecting an ATM cell out of a payload area which is excepted an overhead information of a physical layer frame received from the external ATM network and then outputting the ATM cell;
ATM layer processing means for selecting a useful ATM cell by using a header information of the ATM cell received from the physical layer interface means, selecting a segmentation and reassembly protocol data unit (SAR-PDU) area out of the useful ATM cell and outputting a SAR-PDU of the SAR-PDU area; and
control interface means for converting into a CS-PDU after uniting the SAR-PDUs received from the ATM layer processing means, converting the CS-PDU into a data required from the service process module of the upper layer;

wherein the ATM layer processing means comprises:
a first memory unit for storing the CS-PDU received from the control interface means;
a first processing unit for selecting a video on demand (VOD) and an image phone stream among the ATM cells received from the physical layer interface means, processing the VOD and the image phone stream, and interfacing the ATM cells after converting the VOD and the image phone stream into the ATM cells; and
a second processing unit for separating a cell for maintaining connection between the ATM interface module and the external ATM network and a cell which is required from an external host from the ATM cells received from the physical layer interface means and processing respectively each separated cells; and wherein the control interface means comprises:
a second memory unit for storing the SAR-PDUs received from the ATM layer processing means;
a control processor for converting into a U-SDU and outputting the data; and
an upper layer interface unit for performing interface between the control processor and the service process module.

13. The ATM interface module of claim 12, wherein the first processing unit comprises:
an ATM cell sending/receiving memory unit for interfacing the ATM cells by a 48 byte unit in accordance with a payload of the ATM cell received from the physical layer interface means;
an upper service sending/receiving memory unit for interfacing the VOD and the image phone stream to the service process module of the upper layer; and
a control matching unit for controlling data flows between the ATM cell sending/receiving memory unit and the upper service sending/receiving memory unit and for matching interface between the physical layer interface means and the service process module after erasing/inserting a header part of the payload.

14. The ATM interface module of claim 12, wherein the first memory unit comprises:
a memory area which is commonly used by the second processing unit and a control processor of the control interface means; and
a converting unit for controlling an access means in order that the second processing unit and the control processor respectively, access the memory area exclusively.

15. The ATM interface module of claim 13, wherein the ATM cell sending/receiving memory unit and the upper service sending/receiving memory unit respectively comprise:
a first buffer unit of sending a data for providing an image phone service;
a second buffer unit of receiving a data for providing the image phone service; and
a third buffer unit of sending/receiving a data for providing a VOD service.

16. An asynchronous transfer mode (ATM) interface module in an ATM communication terminal, in which the ATM interface module interfaces between an external ATM network and service process modules provided in an upper layer, comprising:
physical layer interface means for selecting an ATM cell out of a payload area which is excepted an overhead information of a physical layer frame received from the external ATM network and then outputting the ATM cell;

ATM layer processing means for selecting a useful ATM cell by using a header information of the ATM cell received from the physical layer interface means, selecting a segmentation and reassembly protocol data unit (SAR-PDU) area out of the useful ATM cell and outputting a SAR-PDU of the SAR-PDU area; and control interface means for converting into a CS-PDU after uniting the SAR-PDUs received from the ATM layer processing means, converting the CS-PDU into a data required from the service process module of the upper layer;

wherein the ATM layer processing means comprises:
    a first memory unit for storing the CS-PDU received from the control interface means;
    a first processing unit for selecting a video on demand (VOD) and an image phone stream among the ATM cells received from the physical layer interface means, processing the VOD and the image phone stream, and interfacing the ATM cells after converting the VOD and the image phone stream into the ATM cells; and
    a second processing unit for separating a cell for maintaining connection between the ATM interface module and the external ATM network and a cell which is required from an external host from the ATM cells received from the physical layer interface means and processing respectively each separated cells; and wherein the control interface means comprises:
    a second memory unit for storing the SAR-PDUs received from the ATM layer processing means;
    a control processor for converting the U-SDU to the service process module; and
    an upper layer interface unit for performing interface between the control processor and the service process module.

\* \* \* \* \*